Nov. 8, 1955     G. E. SPAULDING     2,723,135
TRAILER HITCH FOR FARM IMPLEMENTS
Filed June 9, 1952     2 Sheets-Sheet 1
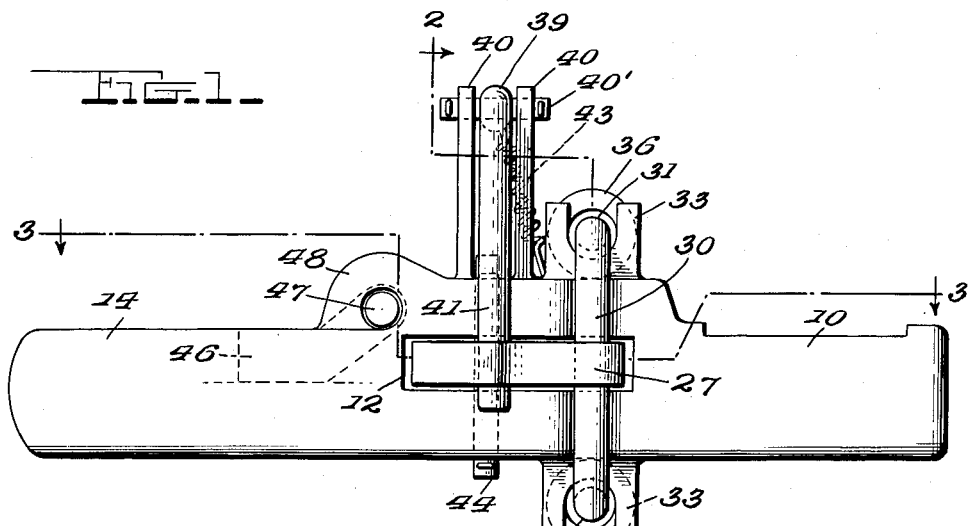
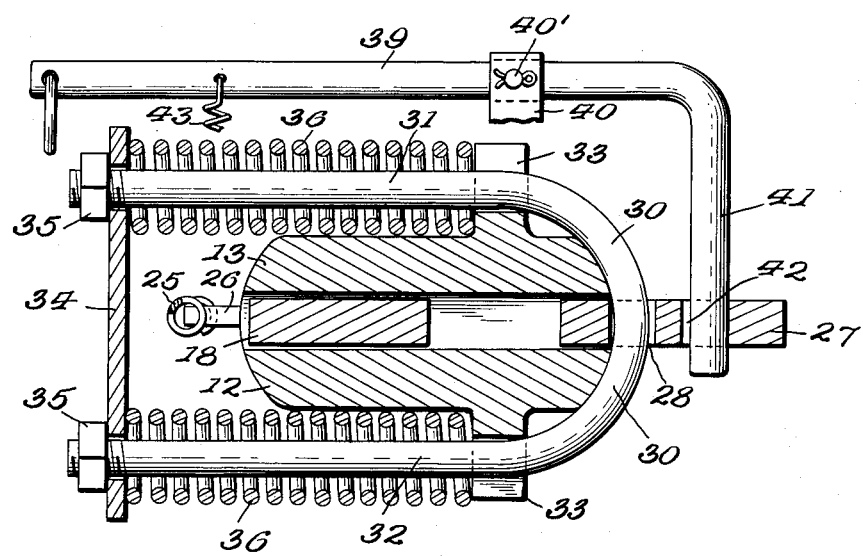
INVENTOR.
G. E. Spaulding
BY
atty.

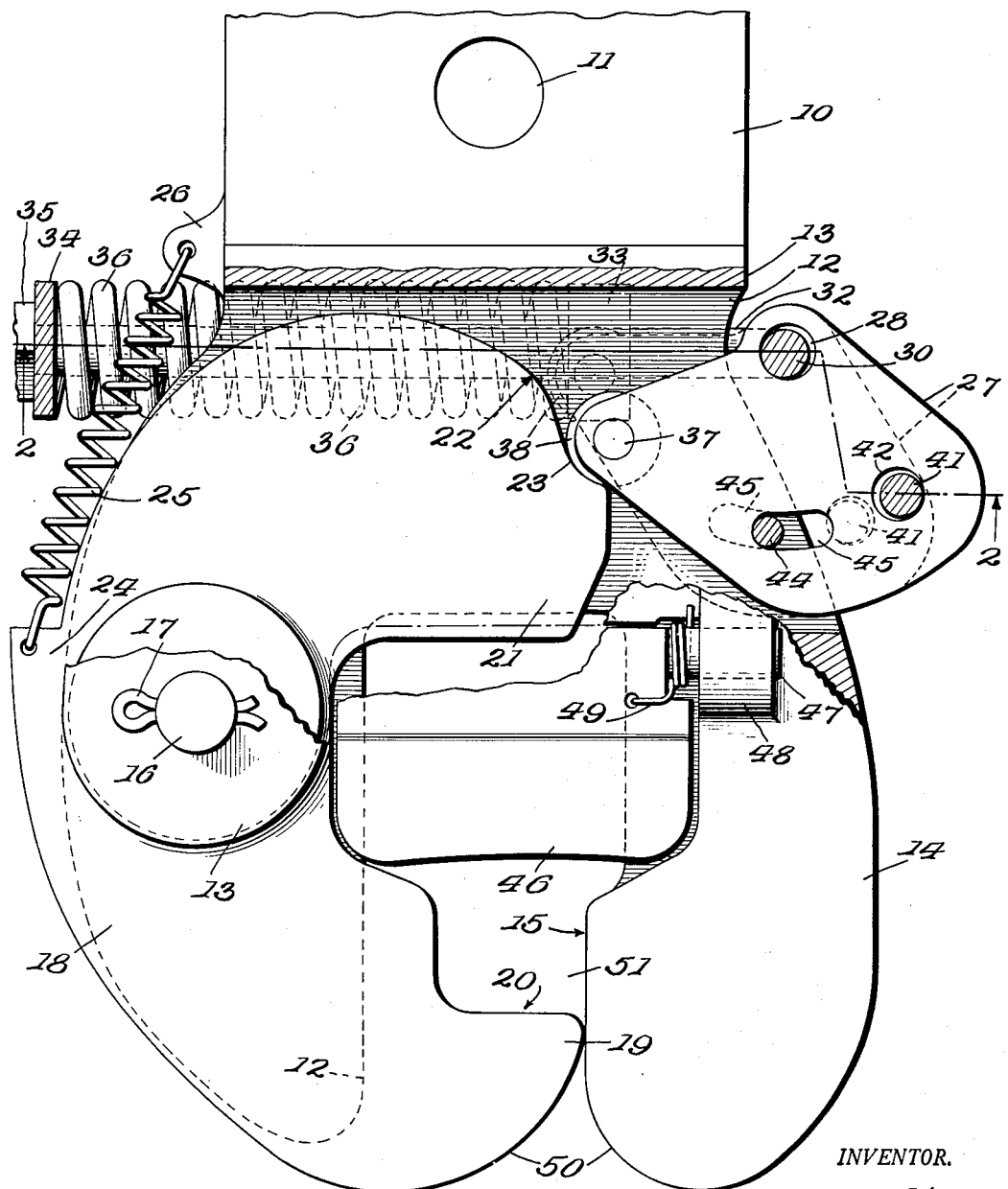

United States Patent Office 2,723,135
Patented Nov. 8, 1955

2,723,135

TRAILER HITCH FOR FARM IMPLEMENTS

Glen E. Spaulding, Sharpsville, Ind.

Application June 9, 1952, Serial No. 292,499

3 Claims. (Cl. 280—509)

This invention relates to tractor hitches and has special reference to a hitch for automatically connecting a farm implement to a tractor.

One important object of the invention is to provide a novel general construction, of simple and positive character, for hitches designed for the purpose set forth.

Another important object of the invention is to provide a novel hitch construction wherein, when the tractor is backed up, the hitch will engage and automatically open to receive the clevis of an agricultural implement.

A further important object of the invention is to provide improved latching means for such a hitch.

Yet another object of the invention is to provide a novel latching means having a movable pivot spring urged to assist in closing the hitch after engagement of the implement clevis.

With the above and other objects in view that will become apparent as the nature of the invention is better understood, the same consists in the novel form, combination and arrangement of parts hereinafter more fully described, shown in the accompanying drawings, and claimed.

In the drawings:

Fig. 1 is a rear elevation of the improved hitch,

Fig. 2 is a fragmentary section on lines 2—2 of Figs. 1 and 3, and

Fig. 3 is a plan view, partly in section, on the line 3—3 of Fig. 1 and showing the front end of the hitch at the upper part of the figure and the rear end at the lower part thereof.

In the embodiment of the invention as herein disclosed, there is provided a main hitching portion consisting of a body 10 having an opening 11 therein for the reception of a bolt by means of which the hitch may be attached to the rear of a tractor frame. Extending rearwardly from the rear end of this body 10 is a pair of vertically spaced webs, the lower web being shown at 12 and the upper web being shown at 13. At the right hand side of the device these webs unite to provide a rearwardly extending fixed jaw 14 curved inwardly to provide a face 15. At the left hand side of the device the upper web 13 terminates short of the lower web 12 and through the lower and upper webs extends a pivot bolt 16 preferably held by cotters 17. Extending between the left hand side portions of the webs is a movable jaw 18 having an inturned end 19 which, when the hitch is closed, contacts with the face 15 of the fixed jaw. This inturned portion is further provided with a shoulder 20, which will engage the clevis when the hitch is connected to an implement. The movable jaw 18 is of generally arcuate form and its forward end likewise projects towards the fixed jaw 14 as shown at 21. Formed on this projecting portion is a cam face 22 eccentric to the bolt 16 as clearly shown in Fig. 3. At the rear end of this cam face 22 is an arcuate shoulder 23. Projecting from the movable jaw adjacent the bolt 16 is a lug 24 which is connected by a coiled tension spring 25 with a lug 26 extending from the body 10. This spring tends to swing the movable jaw on the pivot 16 but the action of the cam 22 will, as presently to be understood, prevent the spring from effecting unaided opening of the jaw 18.

The novel latching means includes a lozenge-shaped plate 27 having an opening 28 at its forward and obtuse angled portion. A rod bent to U-shape has the bight 30 thereof extended through the opening 28. The legs of the rod extend across the device, one leg lying above the webs as at 31, while the other leg lies below the webs as at 32. These legs pass through lugs having openings or forks 33 and formed integrally with the webs 12 and 13. The ends of the leg are connected to the left of the lugs by a tie-plate 34, which is held in position by nuts 35 screwed on the leg ends. Surrounding each leg is a coiled compression spring 36 which seats at one end against a lug 33, and at its other end against the tie-plate 34. The forward angle of the plate 27 is thus urged to the left of Fig. 3. One arm of the plate 27 extends between the webs and that arm carries a pin 37 on which is supported a roller 38 engaging normally at the arcuate shoulder 23. Extending across the device is a lever 39 which is tiltably supported on a standard 40 rising from the upper web 13. This lever has a downwardly bent end 41 which normally extends through an opening 42, formed in the arm of the plate 27, which projects to the right from between the webs. This lever 39 is connected by a spring 43, with a lug formed on the upper web, this spring tending to lift the arm 41 in the opening 42, while urging the plate 27 to turn in a counter-clockwise direction, as viewed in Fig. 3, about the bight 30. A lug 44 works in a slot 45 formed in the plate 27 concentric to the opening 28, this lug and slot forming a pin and slot movement limiting device for the plate 27.

Between the fixed arm 14 and movable arm 18 is a flap 46 carried by a journal 47 engaging in a boss 48 formed on web 14. A spring 49 is coiled around the journal 47 and acts to hold the rear part of the flap 46 against the lower web 12 at each side of the opening between the right and left hand portions of the webs and said flap coacts with the shoulder 20 of the movable jaw 18 for holding a clevis against undue freedom of movements.

In operation, when the clevis of a farm implement is engaged between the rounded ends 50 of the fixed and movable jaws, a wedging action will take place so that the rear end of the movable jaw will swing away from the fixed jaw and allow the clevis to pass into the space 51 forward of the shoulder 20. As this swinging motion takes place, the roller 38 will be forced upwardly by the cam surface 22 and the consequence will be that the pivot 30, the arm 41 being engaged in the opening 42, will move towards the right, thus compressing the springs 36. After the clevis has passed the point 19 of the movable arm the arm will swing shut against the face 51 because the springs 36 will urge the pivot 30 to the left and the parts will reassume the position shown in full lines in Fig. 3.

If it is desired to effect manual opening of the movable jaw, it is only necessary to lift the left hand end of the lever 39 whereupon the arm 41 will move the opening 42 to the left, turning the plate 27 in a clockwise direction about the pivot 30 so that the roller is disengaged from the cam surface 22, the plate being in the position shown in broken lines in Fig. 3. Under these last circumstances, the spring 25 acts freely to open the movable arm.

From the above detailed description of the invention, it is believed that the construction, use, and operation thereof will at once be apparent, and while there is herein shown and described the preferred embodiment of the invention it is nevertheless to be understood that minor changes may be made therein without departing from the spirit and scope of the invention as claimed.

What is claimed as new, is:

1. An implement hitch for tractors, said hitch including a body portion having an opening for a securing bolt, a pair of vertically spaced webs extending integrally rearward from said body portion, a fixed jaw extending rearwardly from said webs at one side of the hitch, a jaw pivot bolt extending through said webs at the opposite side of the hitch, a movable jaw swingingly mounted between said webs on said bolt, said movable jaw having a rear end portion extending toward and having an inner edge normally engaging the inner side of the fixed jaw, an outer edge joining the end of said inner edge at an acute angle to said inner side, so that said jaws may be wedged apart by pushig a coupling clevis into said acute angle, a flap hinged on the body between said jaws with its rear free end in general proximity of the point of contact of the two jaws to restrict movements of a clevis with the jaws, spring means normally urging the movable jaw out of engagement with the fixed jaw, manually releasable latch means holding said movable jaw closed against the fixed jaw, said latch means including a substantially lozenge-shaped plate having a pivot opening at one obtuse angle and having one arm projecting between the webs adjacent the fixed jaw, said plate end having movable jaw engaging means and having an opening at its opposite end, a tilting lever supported from said body and having a latch controlling arm engaged in said last opening, a pivot extending through said pivot opening in the plate, and means to support said pivot.

2. An implement hitch for tractors, said hitch including a body portion having an opening for a securing bolt, a pair of vertically spaced webs extending integrally rearward from said body portion, a fixed jaw extending rearwardly from said webs at one side of the hitch, a jaw pivot bolt extending through said webs at the opposite side of the hitch, a movable jaw swingingly mounted between said webs on said bolt, said movable jaw having a rear end portion extending toward and having an inner edge normally engaging the inner side of the fixed jaw, an outer edge joining the end of said inner edge at an acute angle to said inner side, so that said jaws may be wedged apart by pushing a coupling clevis into said acute angle, a flap hinged on the body between said jaws with its rear free end in general proximity of the point of contact of the two jaws to restrict movements of a clevis with the jaws, spring means normally urging the movable jaw out of engagement with the fixed jaw, manually releasable latch means holding said movable jaw closed against the fixed jaw, said latch means including a substantially lozenge-shaped plate having a pivot opening at one obtuse angle and having one arm projecting between the web adjacent the fixed jaw, said plate end having movable jaw engaging means and having an opening at its opposite end, a tilting lever supported from said body and having a latch controlling arm engaged in said last opening, a pivot extending through said pivot opening in the plate and spring means supporting said pivot and urging it towards the webs carrying the fixed jaw.

3. An implement hitch for tractors, said hitch including a body portion having an opening for a securing bolt, a pair of vertically spaced webs extending integrally rearward from said body portion, a fixed jaw extending rearwardly from said webs at one side of the hitch, a jaw pivot bolt extending through said webs at the opposite side of the hitch, a movable jaw swingingly mounted between said webs on said bolt, said movable jaw having a rear end portion extending toward and having an inner edge normally engaging the inner side of the fixed jaw, an outer edge joining the end of said inner edge at an acute angle to said inner side, so that said jaws may be wedged apart by pushing a coupling clevis into said acute angle, a flap hinged on the body between said jaws with its rear free end in general proximity of the point of contact of the two jaws to restrict movements of a clevis with the jaws, spring means normally urging the movable jaw out of engagement with the fixed jaw, manually releasable latch means holding said movable jaw closed against the fixed jaw, said latch means including a substantially lozenge-shaped plate having a pivot opening at one obtuse angle and having one arm projecting between the webs adjacent the fixed jaw, said plate end having movable jaw engaging means and having an opening at its opposite end, a tilting lever supported from said body and having a latch controlling arm engaged in said last opening, a pivot for said pivot opening, said pivot being formed by the bight of a U-shaped rod having a pair of legs extending across the webs above and below the same, a pair of lugs formed on the webs and having said legs slidable therethrough, a tie plate connecting the ends of said legs, and coiled compression springs surrounding said legs and seated against the lugs and said tie plate.

References Cited in the file of this patent

UNITED STATES PATENTS

| | | |
|---|---|---|
| 2,239,320 | Haniquet | Apr. 22, 1941 |
| 2,332,155 | Lobelle et al. | Oct. 19, 1943 |
| 2,370,679 | Martinelli et al. | Mar. 6, 1945 |
| 2,397,558 | Mennen | Apr. 2, 1946 |
| 2,522,791 | Ketel | Sept. 19, 1950 |

FOREIGN PATENTS

| | | |
|---|---|---|
| 965,965 | France | Sept. 27, 1950 |